US005337697A

United States Patent [19]

Trimarchi et al.

[11] Patent Number: 5,337,697

[45] Date of Patent: Aug. 16, 1994

[54] FELINE WINDOW PERCH

[76] Inventors: William M. Trimarchi; Sharon M. Trimarchi, both of 688 E. Pike, Indiana, Pa. 15701

[21] Appl. No.: 115,121

[22] Filed: Aug. 31, 1993

[51] Int. Cl.5 ................................ A01K 1/03

[52] U.S. Cl. ................................ 119/19

[58] Field of Search .................. 119/15, 19, 28.5, 165

[56] References Cited

U.S. PATENT DOCUMENTS

| | | | |
|---|---|---|---|
| 3,857,365 | 12/1974 | Mueller | 119/28.5 |
| 4,445,459 | 5/1984 | Julie | 119/28.5 |
| 4,989,546 | 2/1991 | Cannaday | 119/19 |
| 5,121,710 | 6/1992 | Gonzalez | 119/19 |
| 5,148,767 | 9/1992 | Torchio | 119/19 |
| 5,165,366 | 11/1992 | Harvey | 119/165 |
| 5,167,202 | 12/1992 | Bradford et al. | 119/15 |
| 5,261,350 | 11/1993 | Vavrek | 119/19 |

*Primary Examiner*—Gene Mancene
*Assistant Examiner*—Todd E. Manahan

[57] ABSTRACT

An enclosed feline window perch is placed in the window of a dwelling to provide the cat with a safe way to experience the outside world. The window perch comprises a perch body having a bottom and a front wall and two side walls extending upwardly from the bottom so as to enclose the front and sides of the perch body. The rear of the perch body is open to allow the cat to enter and exit from the window perch. A roof is attached to an upper end of the walls. The perch is placed in the window and extends outwardly of the dwelling. Upper body extensions on the side walls engage the sash of the window and lower body extensions also on the side walls engage the sill of the window, thereby attaching the perch within the window. The bottom of the perch body has a pair of slotted bracket supports extending downwardly from an underside thereof which are engaged with a pair of brackets that firmly abut against the exterior of the dwelling below the window. Each wall has a large opening therein and a clear panel covering the opening and secured by tabs affixed to the wall. A plurality of smaller vent openings in the bottom, side walls, and roof of the perch allow for the circulation of fresh air through the window perch.

1 Claim, 2 Drawing Sheets

B-B

A-A

1

2

3

4

5

8

9

10

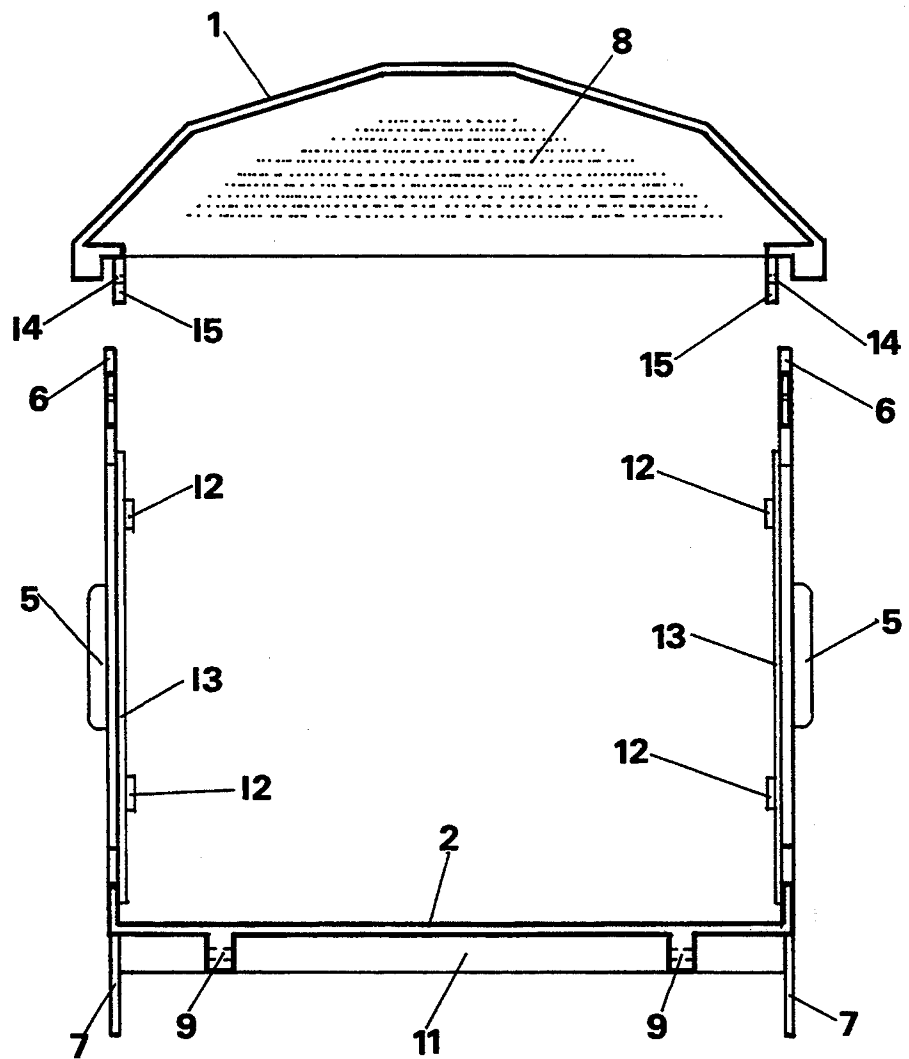
FIG.3
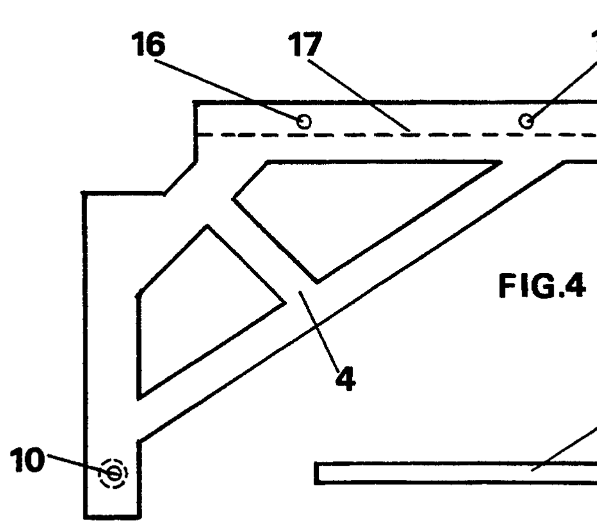
FIG.4
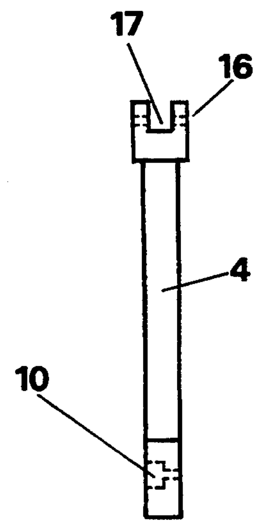
FIG.5
FIG.6

FELINE WINDOW PERCH

FIELD OF THE INVENTION

The invention relates to field of pet enclosures.

DESCRIPTION OF THE PRIOR ART

The prior art includes numerous pet enclosures. U.S. Pat. No. 4,177,761, issued on Dec. 11, 1979 to Louis Bellocchi, Jr., illustrates a pet enclosure that enables the pet to reach through an opening in the roof of the enclosure to gain access to a toy or suspended apparatus. This invention also allows easy access to the pet by a removable portion of the enclosure.

U.S. Pat. No. 4,347,807, issued on Sept. 7, 1982 to Marvin Reich, illustrates a pet enclosure that is collapsible for shipping and storage.

SUMMARY OF THE INVENTION

The primary object of the present invention is to permit the pet owner to provide a cat with a safe way to experience the outside world without leaving the physical area of the dwelling to satisfy its curiosity, regardless of weather conditions and without disturbing the cat's owner. Another object is to provide the cat with an opportunity to experience the outside world without the fear of harmful contact with forces of the outside world.

BRIEF DESCRIPTION OF THE DRAWINGS

FIG. 3 is a view taken along section B—B of FIG. 1, with the roof detached.

FIG. 4 illustrates a side view of the perch body bracket.

FIG. 5 illustrates a front view of the bracket bracing rod.

FIG.6 illustrates a front view of the perch body bracket.

DESCRIPTION OF THE PREFERRED EMBODIMENT

Figure 1:
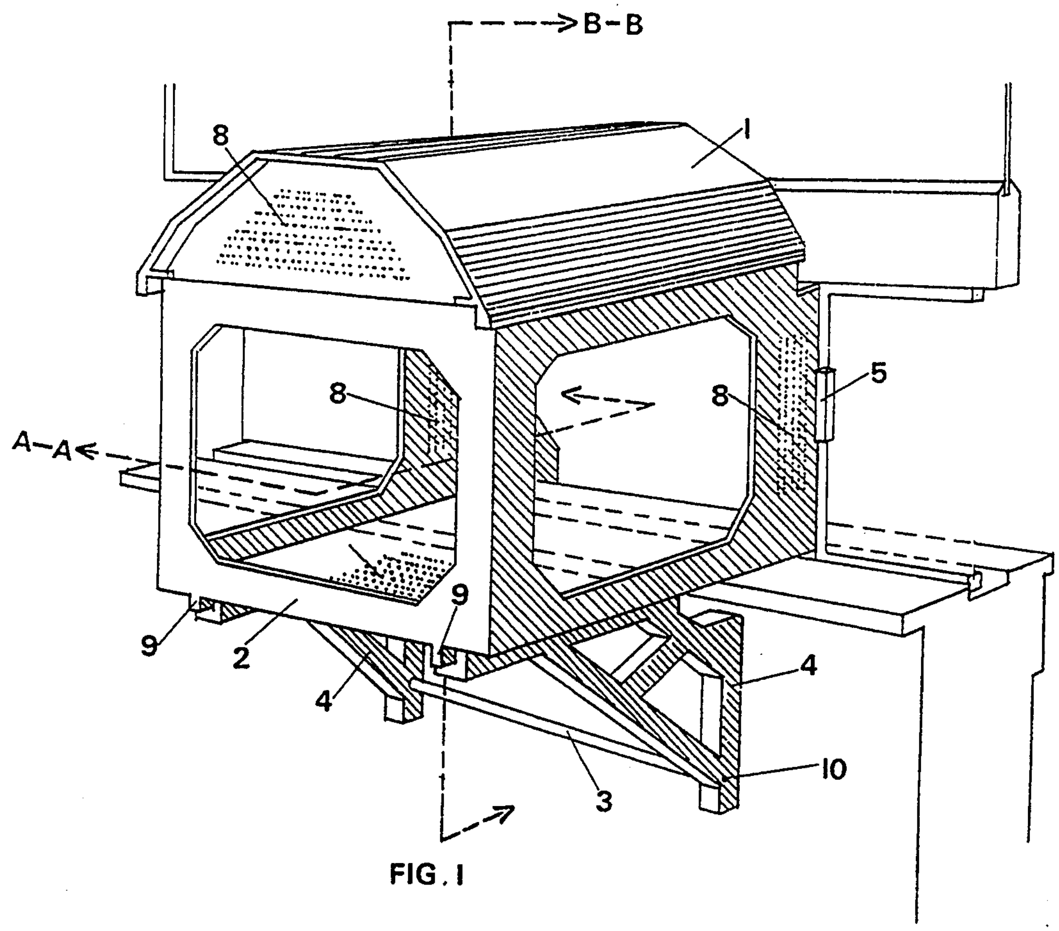
FIG. 1 illustrates the window perch in its intended location in a window opening with the roof body and brackets attached. An adjustable closure is shown on the side of the perch body which may be installed to close areas not occupied by the perch.

Referring to FIG. 1, the enclosed window perch consists of five formed plastic or fiberglass pans, 1, 2, 3, 4, three clear acrylic panels, 13, and ten screws for the attachment of roof, 1, and brackets, 4, to the perch body, 2. The body, 2, of the perch is constructed in one piece and includes items, 5, 6, 7, 8. Item 5 is a tab extending horizontally from each side of the body, 2, that will offer lateral support to any closure panels that may be used to close unwanted openings in the window area. Items 6 are upper rear body extensions that secure the body, 2, at the inside of the window sash. Items 7 are rear lower body extensions that secure the body, 2, at the inside of the window sill, and prevent outward movement of the perch body, 2. Rows of small holes, 8, are placed in indicated areas in the body, 2, and roof, 1, to allow for air circulation, but prevent entry of most insects. Slotted body bracket supports, 9, are also fabricated as part of the body, 2. Horizontal closure, 11, (visible in FIG. 2), is a part of the perch body, 2.

Figure 2:
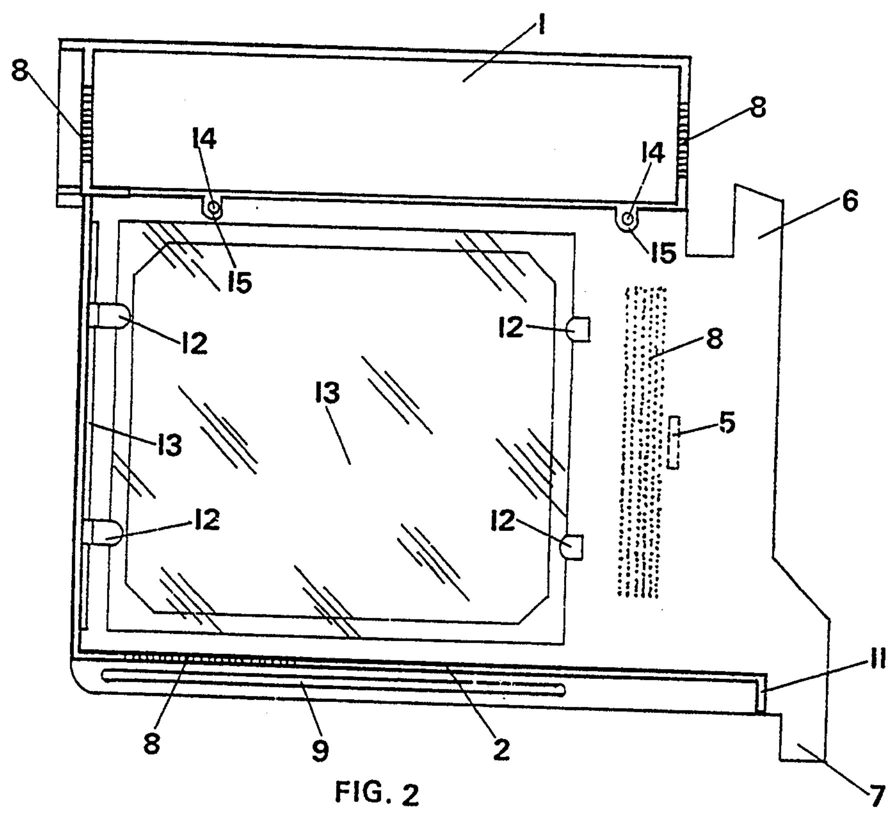
FIG. 2 is a view taken along section A—A of FIG. 1. Clear acrylic panels are indicated in the front and side of the perch body openings.

Referring to FIG. 2, the roof, 1, is secured to the perch body, 2, at the locations where roof tabs, 15, are indicated. Holes are provided in the tabs, 15, and in the roof, 1, to allow screws with nuts, 14, to fasten roof, 1, to the perch body, 2. The roof, 1, is fabricated as a single unit with holes, 8, for air circulation. Clear acrylic panels, 13, are secured by tabs, 12, which are formed into the body, 2.

Referring to FIG. 3, the rear of the body, 2, opens to allow an unobstructed entry of the cat from the inside of the dwelling.

FIGS. 4 and 6 illustrate the body support brackets, 4, which are designed to include bolt holes, 16, and grooves, 17, to receive body bracing supports, 9, and recessed holes, 10, to install the bracket bracing rod, 3, that is secured with screws, 14.

The feline window perch is installed by placing the body, 2, on the window sill with the lower body extensions, 7, pushed firmly against the inside edge of the window sill. The window sash is then lowered to rest on the top of the rear of the body, 2, with the upper body extensions, 6, against the inside surface of the sash. The body support brackets, 4, are then installed by placing them onto the body bracing brackets, 9, so that the bracing bracket fits into the grooves, 17, of the support brackets, 4. The support brackets, 4, are then pressed firmly against the exterior building surface. Screws, 14, are installed in holes, 16, and through slots in the bracing bracket, 9, and bolted to secure the perch in a stable position. The acrylic panels, 13, are then installed by sliding them between tabs, 12, and the inside of the body, 2. The roof, 1, is placed on the body, 2, and attached at tabs, 15, by screws and bolts, 14. Bracing rod, 3, is installed into ends of brackets, 4, at recess, 10. Screws, 14, are installed at pre-drilled holes, through brackets, 4, and into bracing rod, 3.

While presently preferred embodiments of the invention have been described and shown in the drawings with particularity, the invention may be otherwise embodied within the scope of the following claims.

What is claimed is:

1. An enclosed feline window perch for placement in a window of a dwelling comprising:

a perch body having a front, rear, and two sides; said perch body further including a bottom and a front wall and two side walls extending upwardly from the bottom so as to enclose the front and sides of said perch body, respectively; the rear of said perch body being open for allowing entrance and egress from said perch body; each side wall including an upper body extension projecting upwardly therefrom for engaging with a sash of the window and a lower body extension projecting downwardly therefrom for engaging with a sill of the window, thereby attaching the perch within the window, said upper and lower body extensions being located adjacent the rear of said perch body; each wall further including a large opening therein and a clear panel covering said opening and secured by tabs affixed to said wall; said bottom including a pair of slotted bracket supports extending downwardly from an underside thereof; each side wall and said bottom having a plurality of smaller vent openings therein for the circulation of fresh air through the window perch;

a roof attached to an upper end of said walls and overlying said perch body; said roof having a plurality of vent openings therein; and a support bracket assembly attached to the bottom of The perch body; said bracket assembly including a pair of brackets each having a groove in an upper end thereof which engages a respective one of said slotted bracket supports on said perch body, and a bracing rod extending between said brackets;

whereby, when said perch is placed in the window, it extends outwardly of the dwelling, the upper body extensions engage the sash of the window, the lower body extensions engage the sill of the window, and the brackets firmly abut against the exterior of the dwelling below the window.

* * * * *